US007508395B2

(12) United States Patent
Kwon

(10) Patent No.: US 7,508,395 B2
(45) Date of Patent: Mar. 24, 2009

(54) APPARATUS AND METHOD OF PROCESSING SIGNALS

(75) Inventor: Su-Hyun Kwon, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 717 days.

(21) Appl. No.: 10/996,682

(22) Filed: Nov. 24, 2004

(65) Prior Publication Data

US 2005/0140686 A1 Jun. 30, 2005

(30) Foreign Application Priority Data

Nov. 26, 2003 (KR) ..................... 10-2003-0084534

(51) Int. Cl.
*G06T 1/60* (2006.01)

(52) U.S. Cl. ....................................... 345/530; 345/204

(58) Field of Classification Search ........... 345/83-100, 345/204, 698, 530-551
See application file for complete search history.

(56) References Cited

U.S. PATENT DOCUMENTS

| | | | | |
|---|---|---|---|---|
| 6,331,862 | B1 * | 12/2001 | Yamada et al. | 345/660 |
| 7,142,183 | B2 * | 11/2006 | Lee | 345/87 |
| 7,148,868 | B2 * | 12/2006 | Lee | 345/87 |
| 7,209,106 | B2 * | 4/2007 | Lu et al. | 345/89 |
| 7,277,105 | B2 * | 10/2007 | Abe et al. | 345/691 |
| 2002/0012006 | A1 * | 1/2002 | Yamada et al. | 345/660 |
| 2004/0150660 | A1 * | 8/2004 | Abe et al. | 345/691 |
| 2005/0156851 | A1 * | 7/2005 | Yun | 345/98 |

* cited by examiner

*Primary Examiner*—Nitin Patel
(74) *Attorney, Agent, or Firm*—MacPherson Kwok Chen Held LLP

(57) ABSTRACT

An apparatus of processing a signal is provided, which includes: a frame memory storing data for two frames; and a signal processing unit writing data for two rows into the frame memory or reading data for two rows from the frame memory during input of data for one row.

18 Claims, 12 Drawing Sheets

APPARATUS AND METHOD OF PROCESSING SIGNALS

CROSS-REFERENCE TO RELATED APPLICATION

This application claims priority, under 35 U.S.C. Section 119, from Korean Patent Application Serial Number 10-2003-0084534 filed on Nov. 26, 2003, which is incorporated herein by reference in its, entirety.

BACKGROUND OF THE INVENTION (a) Field of the Invention

The present invention relates to apparatus and method of processing signals.

(b) Description of Related Art

Generally, a liquid crystal display (LCD) includes a pair of panels including a plurality of pixel electrodes and a common electrode and a liquid crystal (LC) layer interposed between the panels and having dielectric anisotropy. The pixel electrodes are arranged in a matrix and connected to switching elements such as thin film transistors (TFTs). The pixel electrodes are supplied with data voltages through the TFTs row by row. The common electrode ranges over an entire surface of a panel and is supplied with a common electrode. The pixel electrode and the common electrode along with the LC layer disposed therebetween form LC capacitors in circuital view, and a LC capacitor as well as a switching element is a basic element forming a pixel.

The LCD generates electric field in the LC layer by applying voltages to the electrodes, and obtains desired images by controlling the strength of the electric field to varying the transmittance of light incident on the LC layer. At this time, the polarity of the data voltages with reference to the common voltage is periodically reversed in a unit of frame, row, or dot for preventing the deterioration of liquid crystal due to long-time application of unidirectional electric field, etc.

The LCD is increasingly used for displaying motion images and the slow response time of the liquid crystal is focused on. In particular, the increase of the size and the resolution of the display devices severely require the improvement of the response time.

In detail, the slow response time of the liquid crystal makes it take a time for a pixel to reach a desired luminance. The time for obtaining the desired luminance depends on the difference between a target voltage for giving the desired luminance and a previously charged voltage across the LC capacitor of the pixel. The pixel may not reach the desired luminance for a given time if the voltage difference is large.

In order to solve the problem, dynamic capacitance compensation (DCC) for improving the response time without changing the characteristics of the liquid crystal itself is suggested. The DCC applies a voltage higher than the target voltage to the LC capacitor to reduce the time for reaching the desired luminance.

The DCC generates modified image data after comparing image data between successive two or three frames and thus it requires at least one frame memory for storing image data of a frame.

However, the frame memory increases the production cost and the area of a control board.

SUMMARY OF THE INVENTION

An apparatus of processing a signal is provided, which includes: a frame memory storing data for two frames; and a signal processing unit writing data for two rows into the frame memory or reading data for two rows from the frame memory during input of data for one row.

The writing and the reading may be alternate.

The signal processing unit may include a writing line memory and a reading line memory, and the signal processing unit writes input data from an external device to the writing line memory and writes storage data from the frame memory to the reading line memory.

The signal processing unit my write image data from the writing line memory to the frame memory.

The input data may be data for a current frame and the storage data may be data for a previous frame.

The writing line memory and the reading line memory may include FIFO or dual portion RAM.

The signal processing unit may write odd row data of the current frame into the writing line memory and writes odd and even row data of the previous frame stored in the frame memory into the reading line memory during input of the odd row data of the current frame, and the signal processing unit may write even row data of the current frame into the writing line memory and writes odd and even row data of the current frame stored in the reading line memory into the frame memory during input of the even row data of the current frame.

The signal processing unit may compare the data of the current frame stored in the writing line memory and the data of the previous frame stored in the reading line memory and may modify the data of the current frame based on the comparison.

The frame memory may receive and output two data for a clock.

The frame memory may include DDR SDRAM.

The signal processing unit may convert a bit number and an operation frequency of the input data and may store the converted data into the frame memory.

The bit number of the converted data may be equal to 32 bits.

A display device may include the above-described apparatus.

A method of processing a signal is provided, which includes: receiving input data from an external device; writing the input data for two rows into the frame memory during input of the input data for one row; and reading storage data for two rows from the frame memory during input of the input data for one row.

The input data may be data for a current frame and the storage data are data for a previous frame.

The writing and the reading may alternate.

The method may further include: comparing the data of the current frame and the data of the previous frame; and modifying the data of the current frame based on the comparison.

The method further include: converting a bit number and an operation frequency of the input data; and writing the converted data into the frame memory.

BRIEF DESCRIPTION OF THE DRAWINGS

The present invention will become more apparent by describing embodiments thereof in detail with reference to the accompanying drawings in which.

DETAILED DESCRIPTION OF PREFERRED EMBODIMENTS

Figure 1:
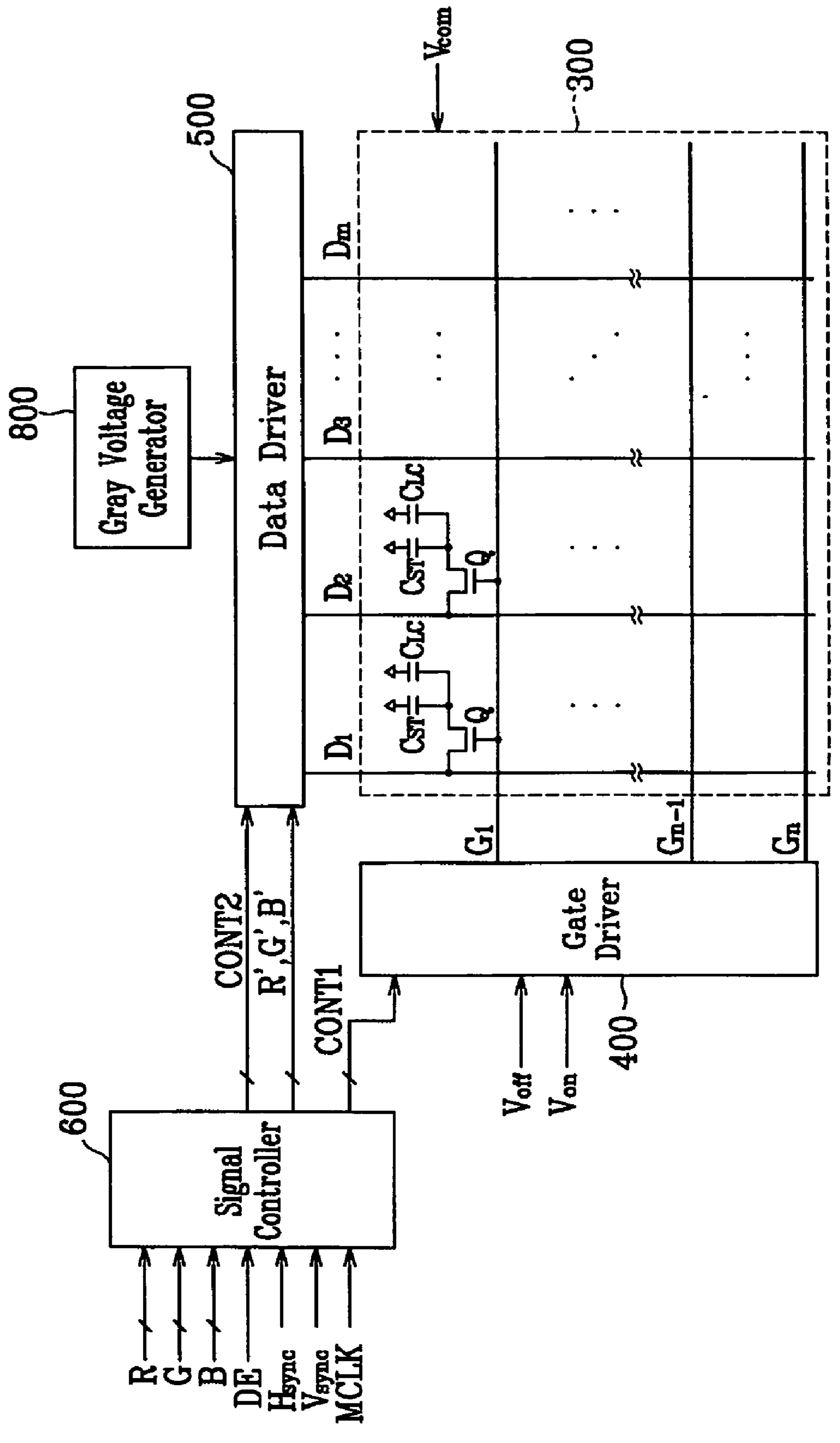
FIG. 1 is a block diagram of an LCD according to an embodiment of the present invention.

The present invention now will be described in more detail hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, signal processing apparatus and methods, and display devices including signal processing apparatus according to embodiments of the present invention will be described in detail with reference to the accompanying drawings.

An LCD according to an embodiment of the present invention will be described in detail with reference to FIGS. 1 and 2.

Figure 2:
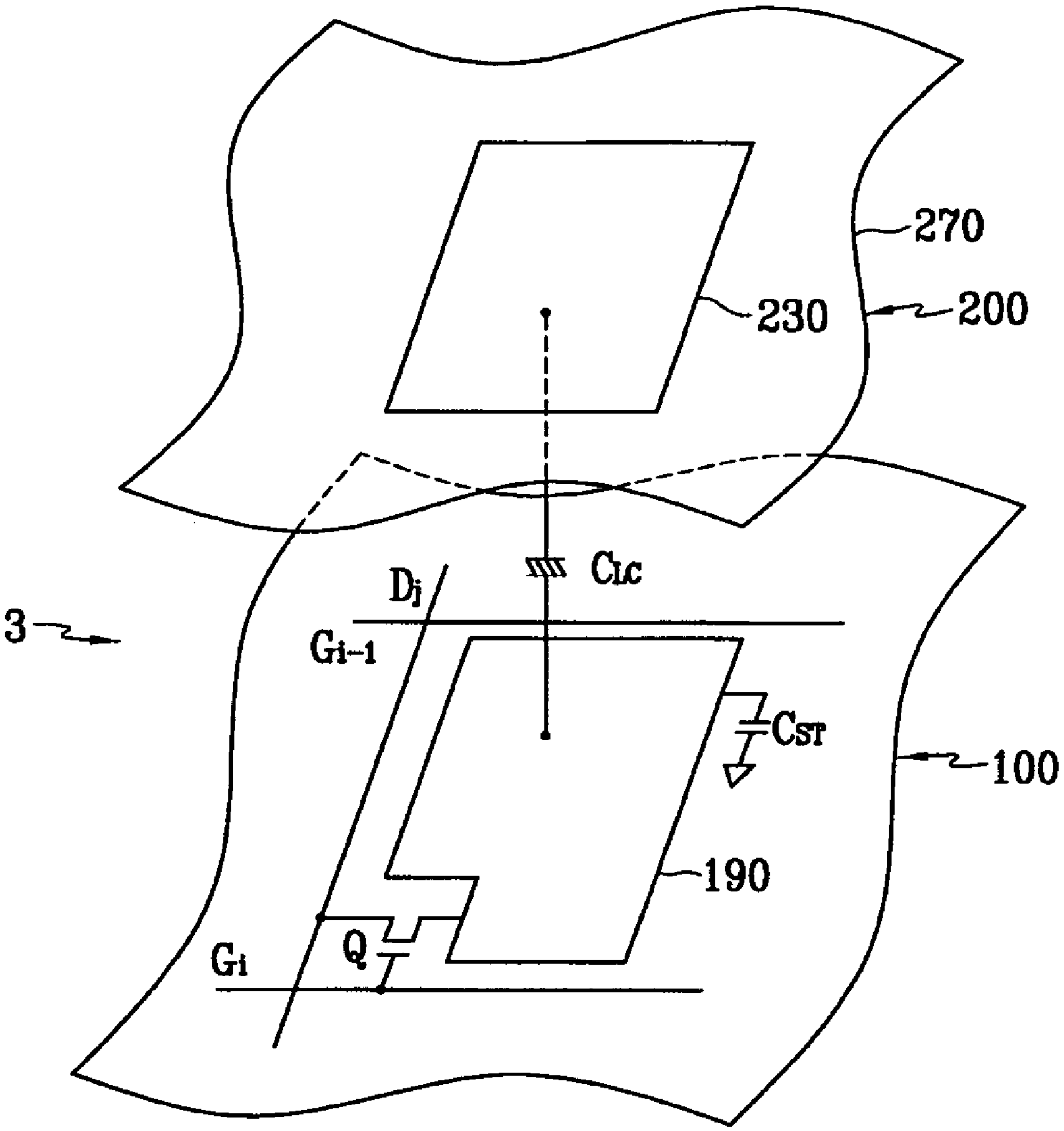
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

Referring to FIG. 1, an LCD according to an embodiment includes a LC panel assembly 300, a gate driver 400 and a data driver 500 that are connected to the panel assembly 300, a gray voltage generator 800 connected to the data driver 500, and a signal controller 600 controlling the above elements.

In circuital view, the panel assembly 300 includes a plurality of display signal lines $G_1$-$G_n$ and $D_1$-$D_m$ and a plurality of pixels connected thereto and arranged substantially in a matrix.

The display signal lines $G_1$-$G_n$ and $D_1$-$D_m$ include a plurality of gate lines $G_1$-$G_n$ transmitting gate signals (also referred to as "scanning signals"), and a plurality of data lines $D_1$-$D_m$ transmitting data signals. The gate lines $G_1$-$G_n$ extend substantially in a row direction and substantially parallel to each other, while the data lines $D_1$-$D_m$ extend substantially in a column direction and substantially parallel to each other.

Each pixel includes a switching element Q connected to the signal lines $G_1$-$G_n$ and $D_1$-$D_m$, and a LC capacitor $C_{LC}$ and a storage capacitor $C_{ST}$ that are connected to the switching element Q. The storage capacitor $C_{ST}$ may be omitted if unnecessary.

The switching element Q is provided on a lower panel 100 and it has three terminals: a control terminal connected to one of the gate lines $G_1$-$G_n$; an input terminal connected to one of the data lines $D_1$-$D_m$; and an output terminal connected to both the LC capacitor $C_{LC}$ and the storage capacitor $C_{ST}$.

The LC capacitor $C_{LC}$ includes a pixel electrode 190 provided on the lower panel 100 and a common electrode 270 provided on an upper panel 200 as two terminals. The LC layer 3 disposed between the two electrodes 190 and 270 functions as dielectric of the LC capacitor $C_{LC}$. The pixel electrode 190 is connected to the switching element Q and the common electrode 270 is connected to the common voltage $V_{com}$ and covers entire surface of the upper panel 200. Unlike FIG. 2, the common electrode 270 may be provided on the lower panel 100, and both electrodes. 190 and 270 may have shapes of bar or stripes.

The storage capacitor $C_{ST}$ is defined by the overlap of the pixel electrode 190 and a separate wire (not shown) provided on the lower panel 100 and applied with a predetermined voltage such as the common voltage $V_{com}$. Otherwise, the storage capacitor is defined by the overlap of the pixel electrode 190 and its previous gate line $G_{i-1}$ via an insulator.

For color display, each pixel can represent its own color by providing one of a plurality of red, green and blue color filters 230 in an area corresponding to the pixel electrode 190. The color filter 230 shown in FIG. 2 is provided in the corresponding area of the upper panel 200. Alternatively, the color filters 230 are provided on or under the pixel electrode 190 on the lower panel 100.

A polarizer or polarizers (not shown) are attached to at least one of the panels 100 and 200 to polarize the light.

Referring to FIG. 1 again, the gray voltage generator 800 generates two sets of a plurality of gray voltages related to the transmittance of the pixels. The gray voltages in one set have a positive polarity with respect to the common voltage $V_{com}$, while those in the other set have a negative polarity with respect to the common voltage Vcom.

The gate driver 400 is connected to the gate lines $G_1$-$G_n$ of the panel assembly 300 and applies gate signals from an external device to the gate lines $G_1$-$G_n$. The gate signal is a combination of a gate-on voltage Von and a gate-off voltage Voff.

The data driver 500 is connected to the data lines $D_1$-$D_m$ of the panel assembly 300 and selects gray voltages from the gray voltage generator 800 to apply as data signals to the data lines $D_1$-$D_m$.

The gate driver 400 or the data driver 400 may include a plurality of driver integrated circuit (ICs) that are mounted directly on the panel assembly 300 or mounted on flexible printed circuit films to form tape carrier packages attached to the panel assembly 300. Alternatively, the gate driver 400 or the data driver 500 may be integrated into the panel assembly.

The signal controller 600 controls the gate driver 400, the data driver 500, and so on.

Next, the operation of the LCD will be described in detail.

The signal controller 600 is supplied from an external graphic controller (not shown) with input image signals R, G and B and input control signals controlling the display thereof, for example, a vertical synchronization signal Vsync, a horizontal synchronization signal Hsync, a main clock signal MCLK, a data enable signal DE, etc. The signal controller 600 modifies the input image signals R, G and B based on the operating condition of the panel assembly 300 and provides the modified image signals R', G' and B' for the data driver 500. Moreover, the signal controller 600 generates a plurality of gate control signals CONT1 and data control signals CONT2 on the basis of the input image signals and the input control signals and it provides the gate control signals CONT1 for the gate driver 400 and the data control signals CONT2 for the data driver 500.

The gate control signals CONT1 include a scanning start signal STV for instructing to start the scanning of the gate-on voltage Von and at least a clock signal for controlling the output timing of the gate-on voltage Von.

The data control signals CONT2 include a horizontal synchronization start signal STH for informing of data transmission for a pixel row, a load signal LOAD or TP for instructing to apply the data voltages to the data lines $D_1$-$D_m$, an inversion control signal RVS for reversing the polarity of the data voltages (with respect to the common voltage Vcom), and a data clock signal HCLK.

The data driver 500 receives a packet of the image data R', G' and B' for a pixel row from the signal controller 600. The data driver 500 converts the image data R', G' and B' into analog data voltages selected from the gray voltages from the gray voltage generator 800 and applies the data voltages to the data lines $D_1$-$D_m$ in response to the data control signals CONT2 from the signal controller 600.

Responsive to the gate control signals CONT1 from the signal controller 600, the gate driver 400 applies the gate-on voltage Von to the gate line $G_1$-$G_n$, thereby turning on the switching elements Q connected thereto. The data voltages applied to the data lines $D_1$-$D_m$ are supplied to the corresponding pixels via the turned-on switching elements Q.

By repeating this procedure by a unit of a horizontal period (which is also denoted by "1H" and equal to one periods of the horizontal synchronization signal Hsync and the data enable signal DE), all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing through a data line in one frame are reversed (e.g., line inversion and dot inversion), or the polarity of the data voltages in one packet are reversed (e.g., column inversion and dot inversion).

Now, a signal processing apparatus that can be used in the above-described LCD will be described in detail.

Figure 3:
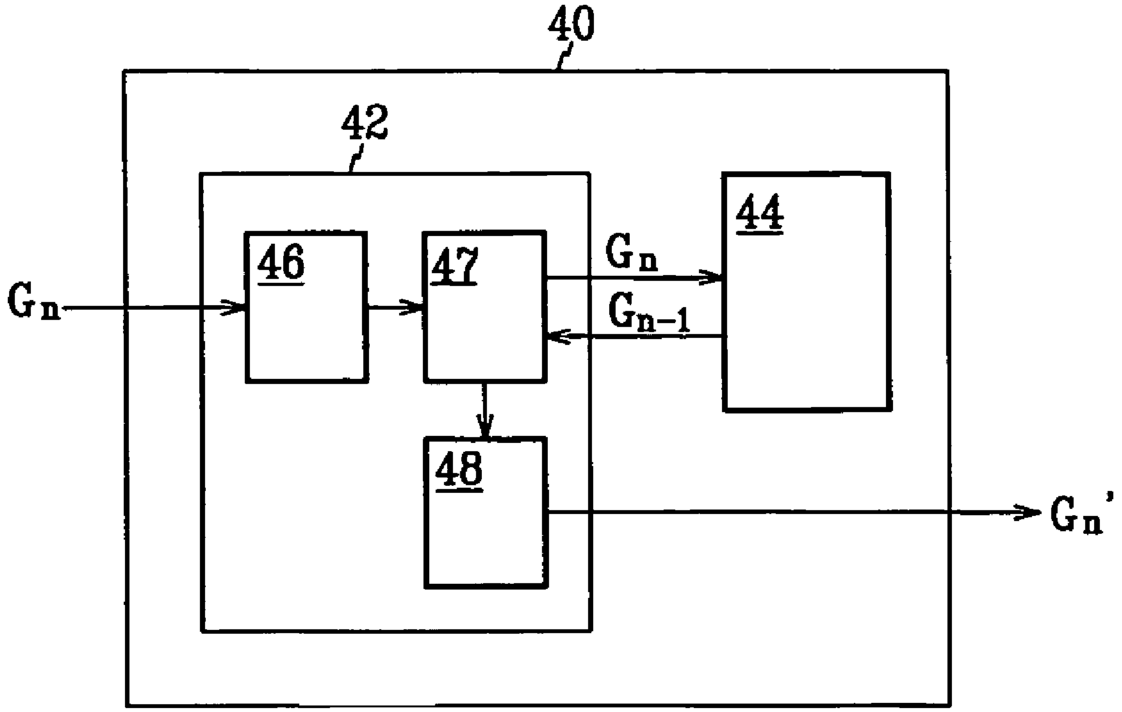
FIG. 3 is a block diagram of a signal processing device 40 according to an embodiment of the present invention.

FIG. 3 is a block diagram of a signal processing apparatus 40 according to an embodiment of the present invention.

As shown in FIG. 3, a signal processing apparatus 40 according to an embodiment of the present invention includes a signal processing unit 42 and a frame memory 44 connected thereto. An input and an output of the signal processing unit 42 serve as an input and an output of the signal processing apparatus 40.

The signal processing unit 42 includes a data converter 46, an line memory 47 connected to the data converter 46, and a data modifier 48 connected to the line memory 47 and having an output serving as the output of the signal processing apparatus 40.

The data converter 46 receives 48-bit image data $G_n$ for a current frame (referred to as "current image data" hereinafter) from an external device, and converts the 48-bit image data $G_n$ into 24-bit data. The 48-bit input image data $G_n$ are transmitted at a first predetermined clock frequency, for example, 54 MHz, and the converted 24-bit data $G_n$ are transmitted at a second predetermined clock frequency, for example, 108 MHz.

The line memory 47, which can store image data for a plurality of rows of image data by unit of row, stores the 24-bit current data $G_n$ from the data converter 46 and transmits the current image data $G_n$ to the frame memory 44 and receives and stores image data $G_{n-1}$ for a previous frame (referred to as "previous image data" hereinafter) stored in the frame memory 44.

The frame memory 44 stores the current image data $G_n$ from the line memory 47 and outputs the previous image data $G_{n-1}$ to the line memory 47. The frame memory 44 stores both the current image data $G_n$ and the previous image data $G_{n-1}$.

The data modifier 48 receives and compares the current image data $G_n$ and the previous image data $G_{n-1}$ and generates modified image data $G'_n$ for the current image data $G_n$ to be transmitted to the data driver 500.

The signal processing apparatus 40 as a whole or only the signal processing unit 42 may be incorporated into the signal controller 600.

Figure 4:
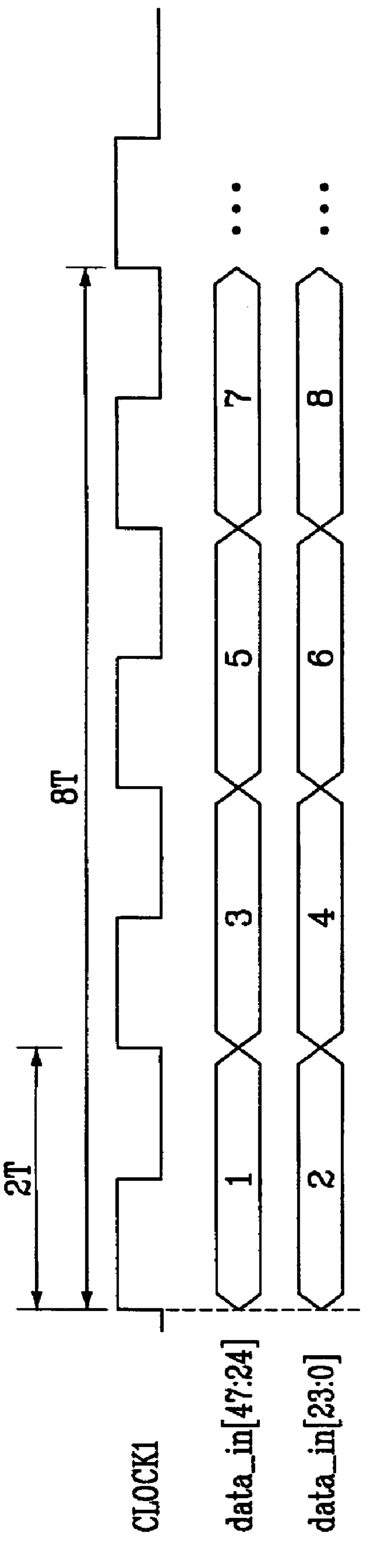
FIG. 4 illustrates exemplary waveforms of input signals entering the signal processing unit shown in FIG. 3.
Figure 5:
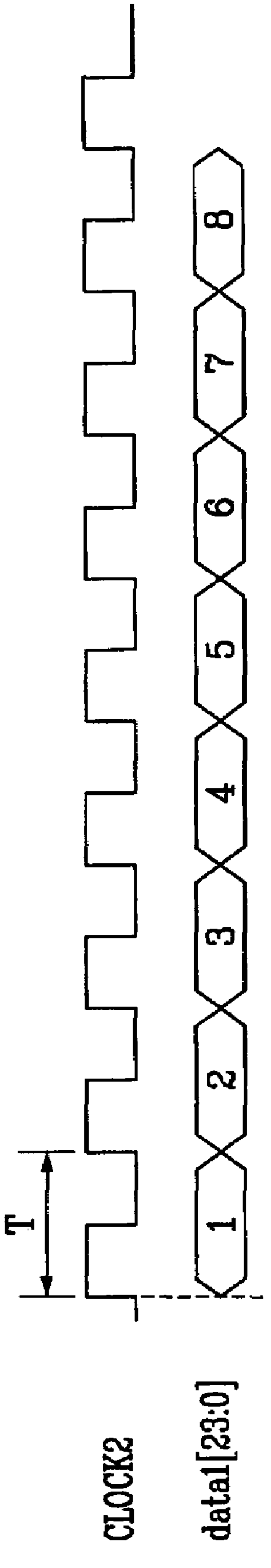
FIG. 5 illustrates exemplary waveforms of output signals from the data converter.
Figure 6:
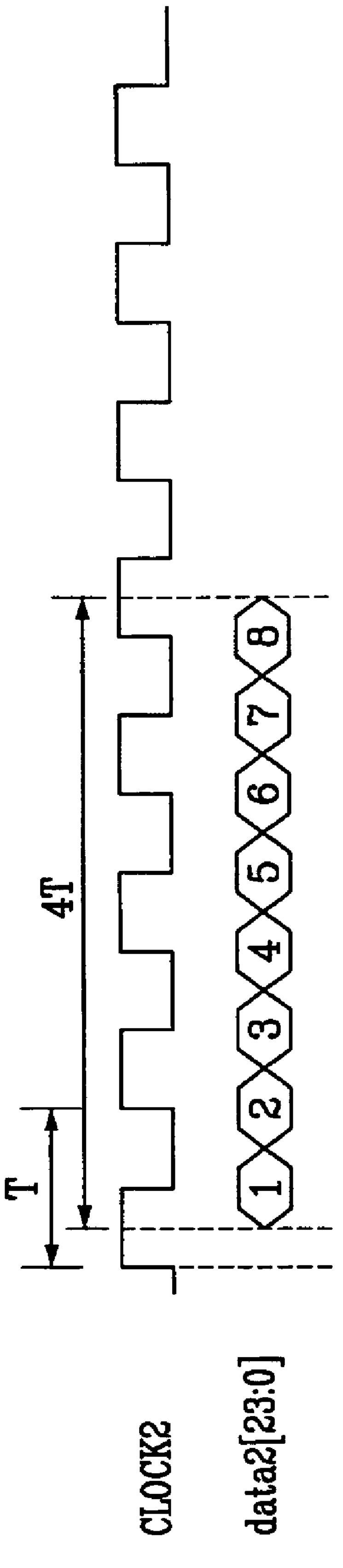
FIG. 6 illustrates exemplary waveforms of output signals from the line memory and the data output block.

Referring to FIGS. 4-6, the conversion of the frequency and the bit number of the image data in the signal processing unit 42 is described more in detail.

FIG. 4 illustrates exemplary waveforms of input signals entering the signal processing unit shown in FIG. 3, FIG. 5 illustrates exemplary waveforms of output signals from the data converter, and FIG. 6 illustrates exemplary waveforms of output signals from the line memory and the frame memory.

FIG. 4 shows that each of the 48-bit input image data R, G and B entering the signal processing unit 42 includes two 24-bit sub-data (data_in[47:24] and data_in[23:0]). The data stream (data_in[47:24] and data_in[23:0]) are synchronized with an input clock CLOCK1. Reference character "2T" shown in FIG. 4 indicates a period corresponding to the first predetermined frequency, which is the frequency of the input clock CLOCK1, for example, 54 MHz.

FIG. 5 shows the 24-bit data (data1[23:0]) converted by the data converter 46.

The data converter 46 can be easily implemented by a multiplexer. For example, the multiplexer can select the input data stream (data_in[47:24]) at high levels of the input clock CLOCK1 and select the input data stream (data_in[23:0]) at low levels of the input clock CLOCK1, thereby generating a data stream (data1[23:0]) in synchronization with a clock CLOCK2 having a frequency 108 MHz corresponding to the period "T."

The line memory 47 receives the data stream (data1[23:0]) and outputs the data stream (data2[23:0]). The data inputted to and outputted from the line memory 47 contain the same information, but they have different variation periods.

The line memory 47 can be implemented by using FIFO (First-In-First-Out) or dual port RAM, which have individual input terminal and output terminal such that the input data and the output data are transmitted in synchronization with different clock frequencies. The line memory 47 implemented as FIFO or dual port RAM requires an output clock having a frequency twice the input clock CLOCK2.

Otherwise, the line memory 47 can be implemented by two single port RAMs and a multiplexer. In this case, the output clock can have a frequency equal to the input clock CLOCK2.

The frame memory 44 may include DDR RAM (double-data-rate random access memory). The DDR RAM, which is also referred to as DDR SDRAM (synchronous dynamic RAM), reads and writes at both rising and falling edges of a clock applied thereto. On the contrary, SDR SDRAM (single data rate SDRAM) or SDRAM reads or writes at either a rising edge or a falling edge of a clock. Accordingly, the DDR RAM has a speed twice that of the SDRAM. In other words, the time required for storing a give amount of data by the DDR RAM is half of that by the SDRAM.

Referring to FIG. 6, the 24-bit data stream (data2[23:0]) can be read and written at rising and falling edges of the clock CLOCK2, respectively. Since the data stream (data1[23:0]) shown in FIG. 5 is processed by a unit of one clock, eight data 1-8 can be processed for a time of 8T. On the contrary, eight data 1-8 of the data stream (data2[23:0]) shown in FIG. 6 can be processed for a time of 4T since the data stream (data1[23:0]) is processed by a unit of half clock. Accordingly, the DDR SDRAM reduces the data processing time to a half such that two frame data are processed during the input of one frame data.

For example, an SXGA (super extended graphics array) display device having 1280×1024 pixels requires 1,280×1,024×24=31,457,280 bits of image data for a frame since a pixel requires 48 bits of image data. If 24-bit data are supplied to a frame memory capable of storing 32-bit data, remaining 8-bit data storage for an address are not used and total storage required for storing a frame data of an SXGA display device, which is to be provided by the frame memory, is equal to 1,280×1,024×32=41,943,040 that is larger than the total bits of the data. As a result, a 128-Mbit DDR SDRAM can store two frame data for the SXGA display device.

In the meantime, a commercially available memory has 16-bit or 32-bit data buses. Therefore, the use of the memory in harmony with the 24-bit image data of the LCD may decrease the efficiency of the memory. That is, if an address of a 32-bit memory capable of storing 32-bit data stores only 24-bit data, remaining 8-bit data storage is not used. Accordingly, another embodiment of the present invention converts the image data into 32-bit image data for effectively using the memory.

Referring to FIGS. 7A-9, the conversion of the frequency and the bit number of the image data in the signal processing unit 42 is described more in detail.

Figure 7A:
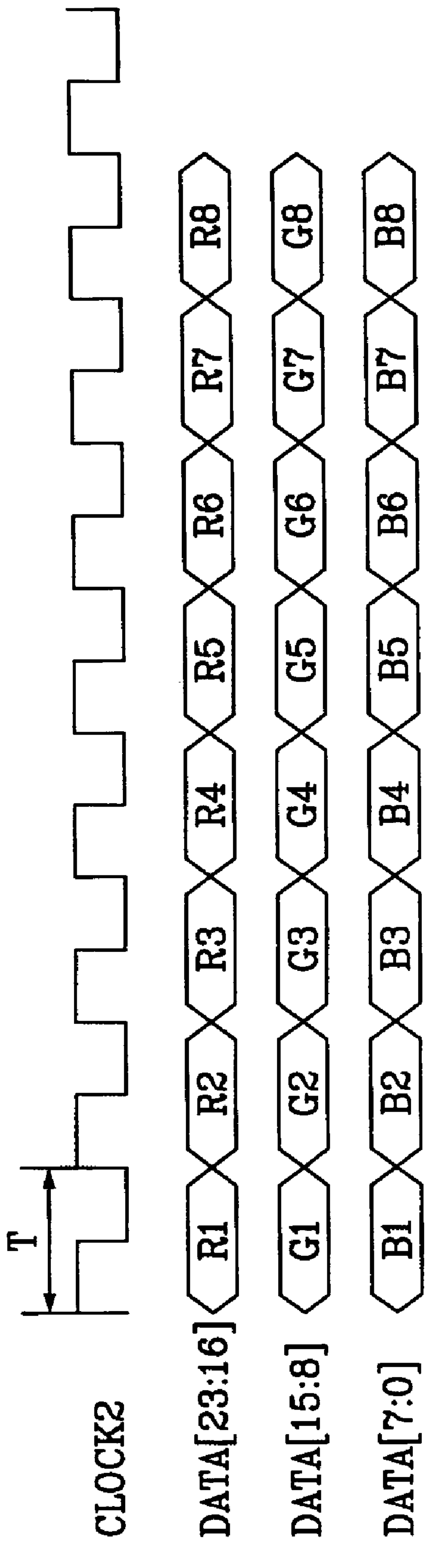
FIGS. 7A-7C illustrates other exemplary waveforms of signals for the signal processing unit and the frame memory shown in FIG. 3.
Figure 7B:
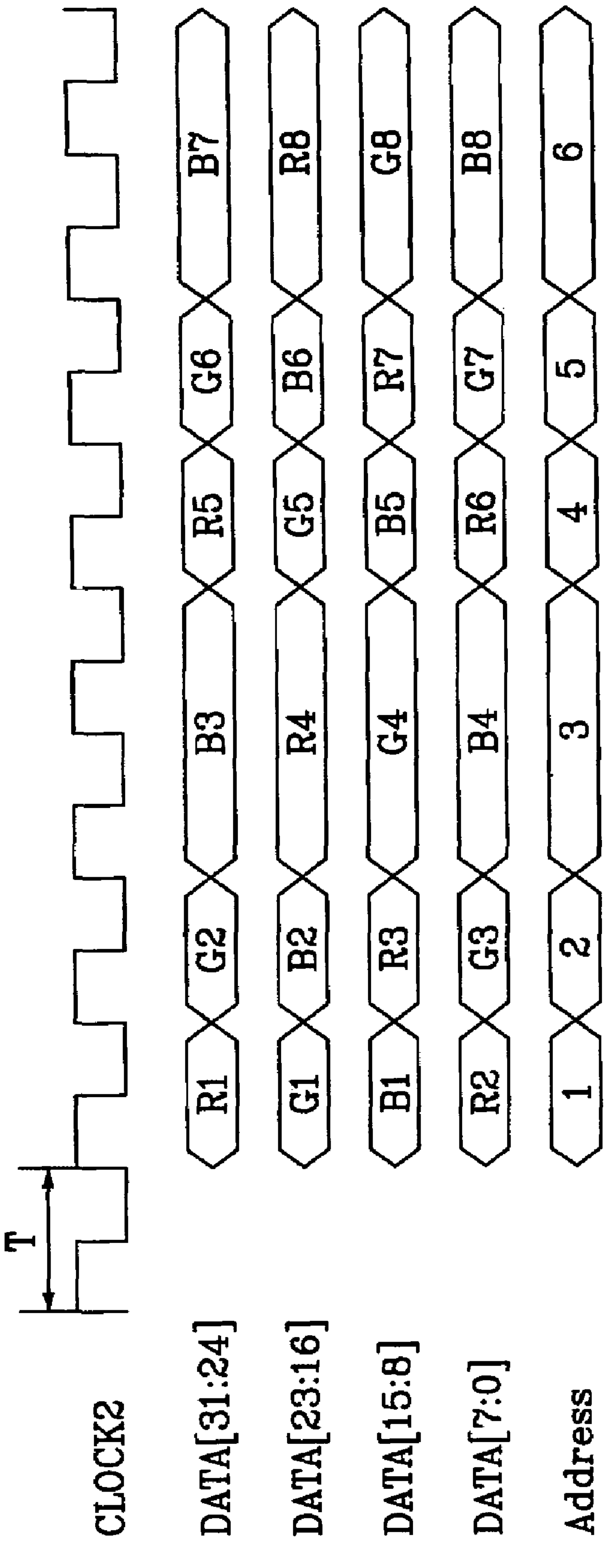
Figure 7C:
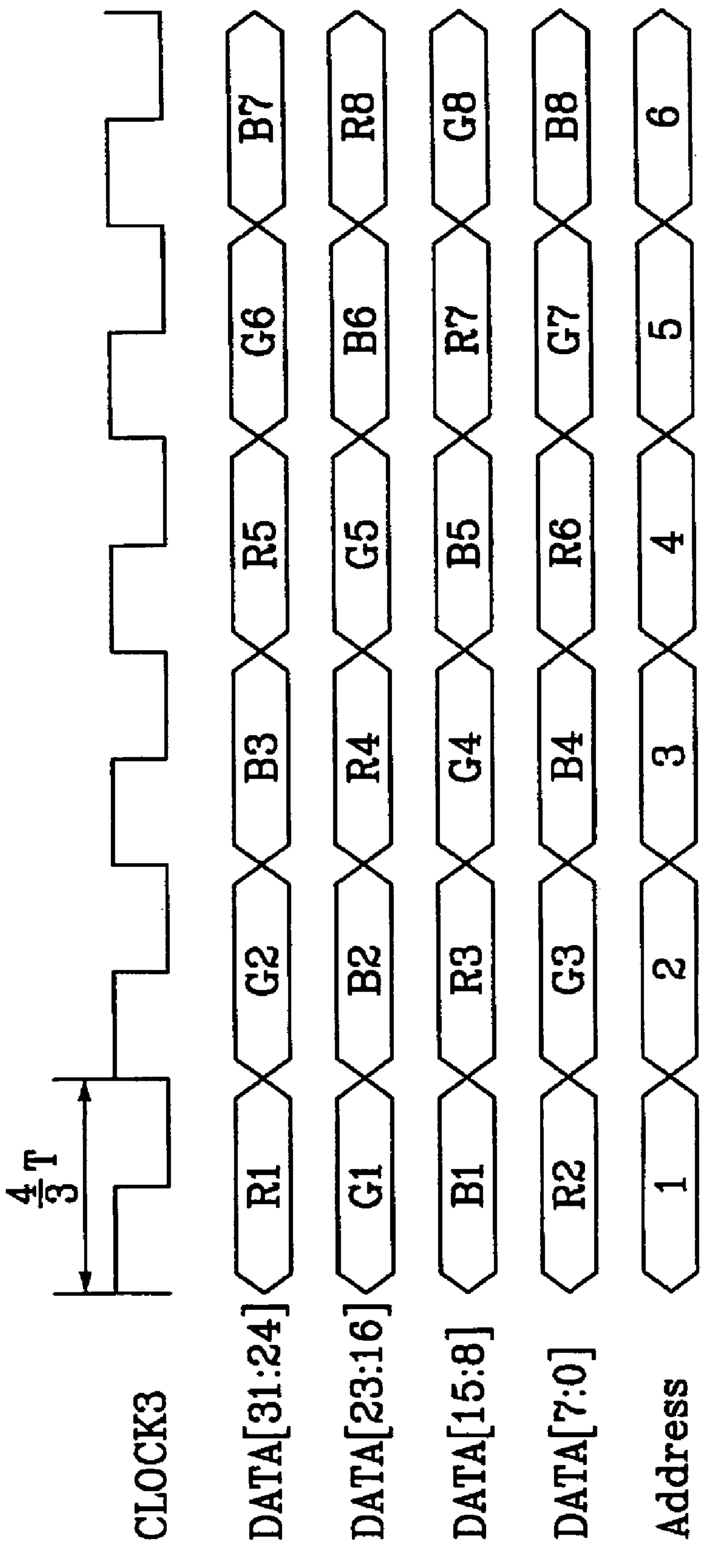
Figure 8:
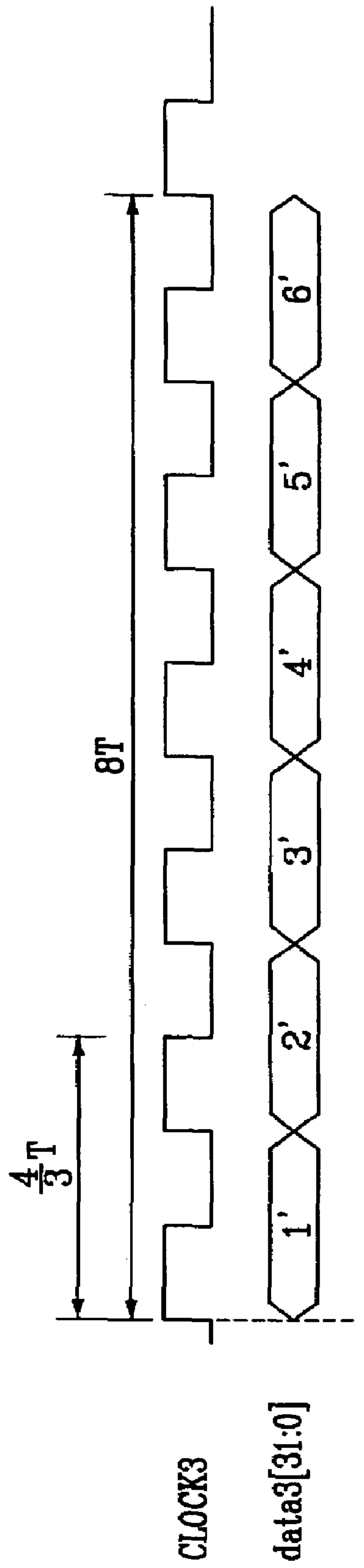
FIG. 8 illustrates other exemplary waveforms of output signals from the data converter.
Figure 9:
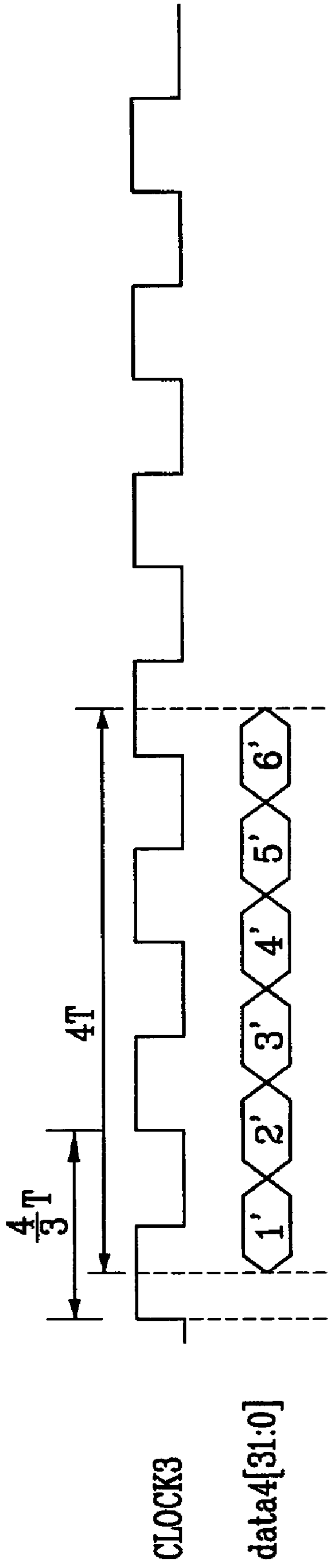
FIG. 9 illustrates other exemplary waveforms of output signals from the line memory and the frame memory.

FIGS. 7A-7C illustrates other exemplary waveforms of signals for the signal processing unit and the frame memory shown in FIG. 3, FIG. 8 illustrates other exemplary waveforms of output signals from the data converter, and FIG. 9 illustrates other exemplary waveforms of output signals from the line memory and the frame memory.

The signal processing unit 42 converts 48-bit input data transmitted at a clock frequency of 54 MHz into 32-bit data and transmits the 32-bit data to the frame memory 44 at a clock frequency of 81 MHz.

FIG. 7A shows that each of the 24-bit data stream (data1[23:0]) shown in FIG. 5 includes three 8-bit sub-data (DATA[23:16], DATA[15:8], and DATA[7:0]).

FIG. 7B shows the 32-bit data (data[31:24], data[23:16], data[15:8], and data[7:0]) converted by the data converter 46 from the 24-bit image data (data1[23:0]). In detail, the data converter 46 synthesizes three sub-data R1, G1, and B1 at a first clock and a sub-data R2 at a second clock to generate a first 32-bit image data including four sub-data R1, G1, B1, and R2, and the data converter 46 stores the first 32-bit image data into a first address of a temporary storage (not shown) included therein. Similarly, the data converter 46 synthesizes two sub-data G2 and B2 at the second clock and two sub-data R3 and G3 at a third clock to generate a second 32-bit image data including four sub-data G2, B2, R3, and G3, and the data converter 46 stores the second 32-bit image data into a second address of the temporary storage. Likewise, a sub-data B3 at the third clock and three sub-data R4, G4, and B4 at a fourth clock are synthesized to form a third 32-bit image data including four sub-data B3, R4, G4, and B4 that is stored into a third address of the temporary storage for a time of two clocks. During four clocks (or 4T), the number of the 32-bit output image data R1-B4 outputted from the data converter 46 is then equal to that of the 48-bit input image data R1-B4 inputted into the data converter 46. In this way, the input data are converted into 32-bit data to be stored in the temporary storage. The temporary storage may include the above-described FIFO or dual port RAM.

As describe above, the output clock frequency of the temporary storage is equal to 81 MHz corresponding to 4T/3. FIG. 7C shows that three 32-bit image data R1-B4 are outputted from the temporary storage in synchronization with 81 MHz.

FIG. 8 shows output data stream of the data converter 46, which are equivalent to the image data shown in FIG. 7C. The six 32-bit image data 1'-6' inputted for a time of 8T are equivalent to eight 24-bit data 1-8 for the same time shown in FIG. 5.

The line memory 47 receives the data stream (data3[31:0]) shown in FIG. 8 and outputs the data stream (data4[31:0]) shown in FIG. 9. The line memory 47 can be also implemented by FIFO or dual port RAM or by two single port RAMs and a multiplexer. In this case, the output clock can have a frequency equal to the input clock CLOCK2.

The frame memory 44 may also include DDR RAM. Referring to FIG. 9, the data stream can be read and written at rising and falling edges of a clock signal CLOCK3, respectively. Since the reading and the writing of the data stream can be preformed by a unit of half clock, the data processing time is reduced to a half such that two frame data are processed during the input of one frame data.

For example, an WUXGA display device having 1,920×1,200 pixels requires 1,920×1,200×24=55,296,000 bits of image data for a frame. Since 32-bit data are supplied to the frame memory 44 capable of storing 32-bit data, the frame memory 44 is effectively used. Therefore, a 128-Mbit DDR SDRAM can store two frame data for the WUXGA display device.

The above-described temporary storage may be included in the line memory 47 or may be the line memory 47 itself.

The operation of the data modifier reads and writes the previous and current image data will be described in detail with reference to FIG. 10.

Figure 10:
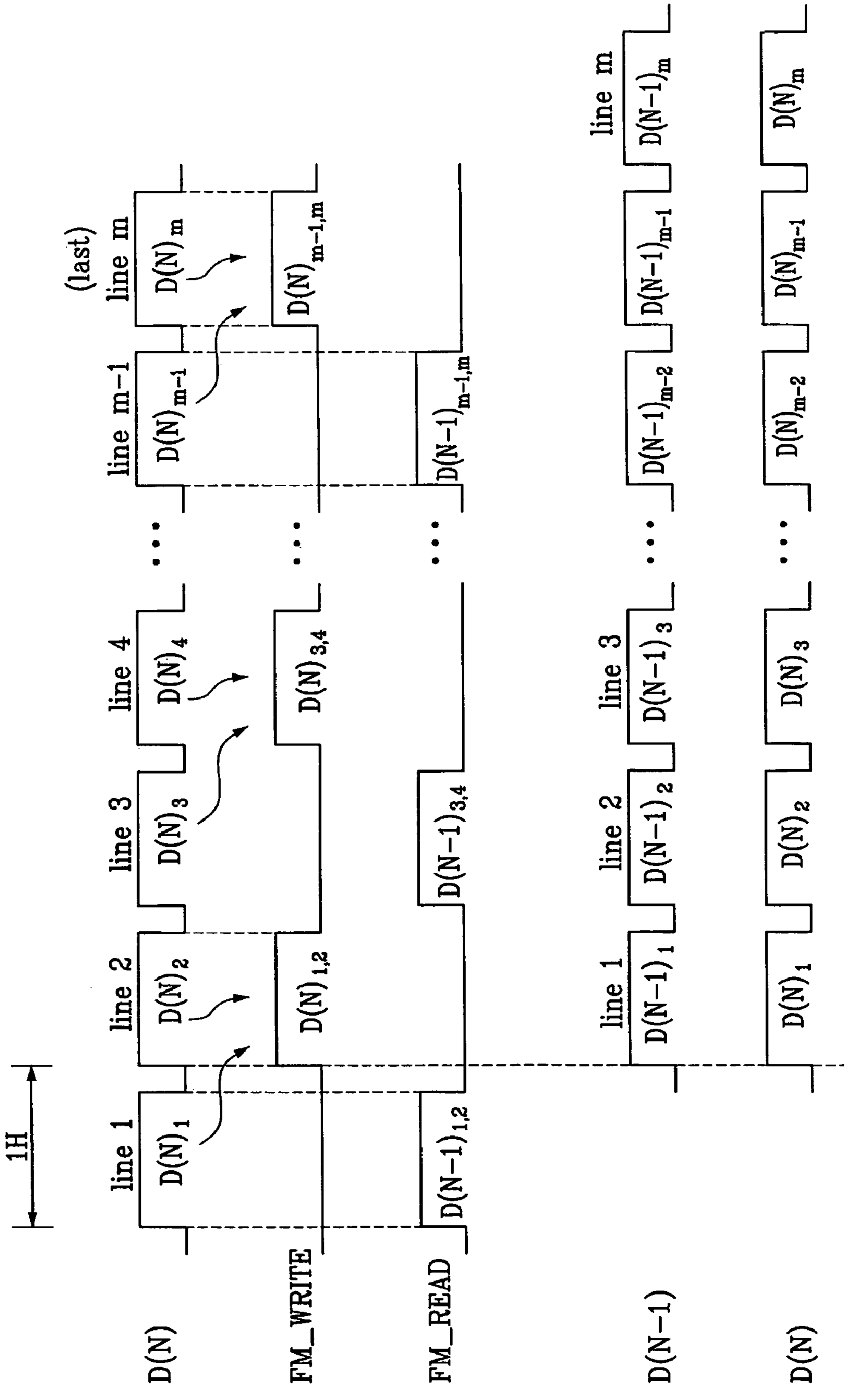
FIG. 10 illustrates an example of the operation of the signal processing unit during the input of image data of the N-th frame.

FIG. 10 illustrates an example of the operation of the signal processing unit during the input of image data of the N-th frame.

It is assumed that an LCD according to this embodiment includes a plurality of pixel rows, for example, m pixel rows. The image data of an N-th frame after the conversion of the bit number and the clock frequency as shown in FIGS. 6 and 9 are denoted by D(N), and the image data for an i-th pixel row (referred to as "i-th row data" hereinafter) among the image data of the N-th frame are denoted by $D(N)_i$.

Referring to FIG. 10, the signal processing unit 42 processes the converted image data for two pixel rows (referred to as "two-row image data" hereinafter) during 1H. For example, the signal processing unit 42 reads or writes the two-row image data for the frame memory 44.

Under the input of a first row data $D(N)_1$, the signal processing unit 42 stores the first row data $D(N)_1$ into the line memory 47, and the signal processing unit 42 reads the first and the second row data $D(N\text{-}1)_1$ and $D(N\text{-}1)_2$ of the previous frame from the frame memory 44 and stores them into the line memory 47.

Under the input of a second row data $D(N)_2$, the signal processing unit 42 writes $D(N)_1$ from the line memory 47 into the frame memory 44, and it stores $D(N)_2$ into the line memory 47 and writes $D(N)_2$ into the frame memory 44. At the same time, the signal processing unit 42 compares D(N-

$1)_1$ and $D(N-1)_1$ after reading them from the line memory 47 and generates a modified image data.

Under the input of a third row data $D(N)_3$, the signal processing unit 42 stores $D(N)_3$ into the line memory 47.and reads the third and the fourth row data $D(N-1)_3$ and $D(N-1)_4$ of the previous frame from the frame memory 44 and stores them into the line memory 47. Furthermore, the signal processing unit 42 compares $D(N-1)_2$ and $D(N-1)_2$ after reading them from the line memory 47 and generates a modified image data.

Under the input of a fourth row data $D(N)_4$, the signal processing unit 42 writes $D(N)_3$ from the line memory 47 into the frame memory 44, and it stores $D(N)_4$ into the line memory 47 and writes $D(N)_4$ into the frame memory 44. At the same time, the signal processing unit 42 compares $D(N-1)_3$ and $D(N-1)_4$ after reading them from the line memory 47 and generates a modified image data.

The signal processing unit 42 repeats the operation for the image data from the fifth pixel row and the m-th pixel row.

Since the frame memory 44 stores the image data from the line memory 47 by unit of two frames, the image data of a previous frame rather than a current frame, which are stored in the frame memory 44 that stores the previous image data and the current image data, will be substituted with the image data of a next frame.

In this way, the signal processing unit 42 writes D(N) into the frame memory 44 and reads D(N-1) from the frame memory 44 and generates modified image data after comparing the D(N) and D(N-1). As a result, the current image data D(N) and the previous image data D(N-1) can be processed by using only one frame memory.

As described above, the use of DDR SDRAM as a frame memory and the conversion of the bit number and the clock frequency enable the storage of two frame data using only one frame memory and reduces the area occupied by the frame memory and the manufacturing cost.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An apparatus of processing a signal, the apparatus comprising:

a frame memory storing data frame, each frame data including multiple sets of row data; and a signal processing unit which receives one set of row data during a predetermined time interval, the signal processing unit writing two sets of row data into the frame memory or reading two sets of row data from the frame memory during the predetermined time interval.

2. The apparatus of claim 1, wherein the writing and the reading are alternate.

3. The apparatus of claim 2, wherein the signal processing unit comprises a writing line memory and a reading line memory, and the signal processing unit writes input data from an external device to the writing line memory and writes storage data from the frame memory to the reading line memory.

4. The apparatus of claim 3, wherein the signal processing unit writes image data from the writing line memory to the frame memory.

5. The apparatus of claim 4, wherein the input data are data for a current frame and the storage data are data for a previous frame.

6. The apparatus of claim 5, wherein the writing line memory and the reading line memory comprise FIFO or dual portion RAM.

7. The apparatus of claim 6, wherein the signal processing unit writes odd row data of the current frame into the writing line memory and writes odd and even row data of the previous frame stored in the frame memory into the reading line * memory during input of the odd row data of the current frame, and the signal processing unit writes even row data of the current frame into the writing line memory and writes odd and even row data of the current frame stored in the reading line memory into the frame memory during input of the even row data of the current frame.

8. The apparatus of claim 7, wherein the signal processing unit compares the data of the current frame stored in the writing line memory and the data of the previous frame stored in the reading line memory and modifies the data of the current frame based on the comparison.

9. The apparatus of claim 8, wherein the frame memory receives and outputs two data for a clock.

10. The apparatus of claim 9, wherein the frame memory comprises DDR SDRAM.

11. The apparatus of claim 2, wherein the signal processing unit converts a bit number and an operation frequency of the input data and stores the converted data into the frame memory.

12. The apparatus of claim 11, wherein the bit number of the converted data is equal to 32 bits.

13. A display device comprising the apparatus of claim 1.

14. A method of processing a signal, the method comprising:

receiving input data from an external device;

writing the input data for two rows into the frame memory during input of the input data for one row; and reading storage data for two rows from the frame memory during input of the input data for one row.

15. The method of claim 14, wherein the input data are data for a current frame and the storage data are data for a previous frame.

16. The method of claim 15, wherein the writing and the reading alternates.

17. The method of claim 16, further comprising: comparing the data of the current frame and the data of the previous frame; and modifying the data of the current frame based on the comparison.

18. The method of claim 17, further comprising: converting a bit number and an operation frequency of the input data; and writing the converted data into the frame memory.

* * * * *